United States Patent [19]

Balfe

[11] Patent Number: 4,505,488

[45] Date of Patent: Mar. 19, 1985

[54] AUTOMATIC INDEXING CHUCK

[76] Inventor: James W. Balfe, 190 Mountain St., Rockville, Conn. 06066

[21] Appl. No.: 424,190

[22] Filed: Sep. 27, 1982

[51] Int. Cl.³ .............................................. B23B 31/34
[52] U.S. Cl. ........................................ 279/5; 279/1 R
[58] Field of Search ................................ 279/5, 1 R, 4

[56] References Cited

U.S. PATENT DOCUMENTS

| 2,621,937 | 12/1952 | Hunziker | 279/5 |
| 2,930,626 | 3/1960 | Sharp | 279/5 |
| 2,998,257 | 8/1961 | Wallingford | 279/5 |
| 3,081,103 | 3/1963 | Renoux et al. | 279/5 |
| 3,096,097 | 7/1963 | Roddy | 279/5 |
| 3,790,181 | 2/1974 | Scharfen | 279/5 X |
| 3,879,045 | 4/1975 | Benjamin et al. | 279/5 |
| 3,880,437 | 4/1975 | Scharfen | 279/5 |
| 3,938,816 | 2/1976 | Manchester | 279/5 |
| 4,209,181 | 6/1980 | Morawski | 279/5 |

Primary Examiner—William R. Briggs
Assistant Examiner—Glenn L. Webb
Attorney, Agent, or Firm—G. Butenkoff

[57] ABSTRACT

An indexing chuck for performing multiple machining operations on a workpiece is disclosed in which the clamping and machining forces applied to the workpiece do not distort the indexing chuck or cause bell mouthing. The indexing chuck is fabricated by securely connecting a top plate, a bottom plate, side plates and a back plate to form a housing having an enlarged aperture therein for accommodating the workpiece. An indexing jaw assembly is removably disposed within the top plate and a clamping jaw assembly is removably disposed in the bottom plate diametrically opposed the indexing jaw assembly. The indexing jaw and clamping jaw assemblies are adapted for securing the workpiece therebetween and for rotating the workpiece through preselected angles. Hydraulic activators apply chucking and unchucking forces to the workpiece and activate a bidirectional motor within the top plate of the chuck housing for indexing and locking the workpiece. The indexing jaw assembly is readily removable from the indexing chuck for changing the rotation angles through which a workpiece is to be rotated for various machining operations. Electrical sensors disposed within the chuck housing provide electrical signals for indexing and locking the workpiece. The indexing chuck is capable of being operated either manually or with numerical control.

13 Claims, 11 Drawing Figures

AUTOMATIC INDEXING CHUCK

TECHNICAL FIELD

This invention relates to chucks and more particularly to a chuck for automatically indexing a workpiece about an axis perpendicular to the rotation axis of the chuck.

BACKGROUND ART

Typically indexing chucks are designed for use where a plurality of operations are required on a part to enable multiple machining operations to be performed without releasing the part from the chuck. Prior art chucks typically include a pair of opposed jaws for gripping a workpiece and for rotating the workpiece through predetermined angles for various machining operations at each of such angles. To obtain reproducible and accurate machining it is imperative that the jaws securely hold the workpiece during operation and accurately rotate the workpiece for subsequent operation. It is also desired to have all of the clamping forces applied to the workpiece and to have the chuck body sufficiently rigid to ensure that the forces do not distort the chuck body or cause bell mouthing.

DISCLOSURE OF INVENTION

A primary object of the present invention is to provide a chuck of the indexing type which provides maximum rigidity to a workpiece without distortion of the chuck.

Another object of the present invention is to provide automated indexing of a workpiece to enable a workpiece to be accurately and reproducibly machined without stopping the machine spindle.

According to the present invention, there is provided an automatic indexing chuck comprising a chuck housing having a top plate adapted for accommodating indexing means for rotating a workpiece, indexing means disposed within the top plate for rotating a workpiece, a bottom plate, clamping activation and deactivation means disposed within the bottom plate for rigidly securing and releasing a workpiece, a pair of side plates disposed in a spaced-apart relationship to one another and rigidly securing the top and bottom plates in a spaced-apart relationship to one another wherein the rigidly connected top and bottom plates and the side plates form a housing having an enlarged aperture extending from a front surface to a back surface of the housing and symmetrically disposed about a centerline axis passing axially through the housing, said aperture having dimensions sufficient to accommodate a workpiece therein mounted in opposing jaws, a back plate fixedly attached to a back surface of the housing, an indexing jaw disposed within the enlarged aperture proximate the front surface of the housing and fixedly attached to the indexing means for rotating the indexing jaw about an axis orthogonal to the centerline axis and passing through the top and bottom plates; a clamping jaw disposed within the enlarged aperture diametrically opposed the indexing jaw and attached to the clamping activation and deactivation means wherein the indexing and clamping jaws are adapted for rigidly holding a workpiece therein; means for activating the indexing means; means for activating the clamping activation and deactivation means, and means for controlling the amount of rotation of the indexing jaw.

A feature of the present invention is the hydraulic motor disposed within the top plate of the housing for rotating the indexing means. A solenoid valve, responsive to electrical signals, is adapted for controlling the rotation direction of the hydraulic motor for indexing or locking the indexing means. A hydraulic cylinder in the bottom plate is adapted for moving the clamping jaw for clamping or releasing a workpiece. Additionally a solenoid valve disposed within the bottom plate and responsive to electrical signals is adapted for controlling the direction of motion of the hydraulic cylinder. Additionally the chuck housing is attached to one end of a lathe spindle for rotating the chuck housing about its centerline axis. A slip ring assembly disposed about the other end of the lathe spindle provides means for conducting electrical signals to and from the solenoid valves and switches within the indexing chuck. A hydraulic swivel connector attached to the lathe spindle provides means for providing hydraulic pressure to the indexing and clamping jaws.

A primary advantage of the present invention is the rigid construction of the housing. The clamping jaw provides rigid restraint of the workpiece without producing bell mouthing of the housing. Additionally the design of the chuck housing enables the whole indexing means and the clamping activation and deactivation means to be removed from the housing without removing the chuck from the lathe spindle. Also enclosing the indexing means within the chuck housing protects the indexing means from the extreme environmental conditions in the machining area thereby improving the accuracy of the indexing.

The foregoing and other objects, features and advantages of the present invention will become more apparent in light of the following detailed description of preferred embodiments thereof as shown in the accompanying drawing.

BEST MODE FOR CARRYING OUT THE INVENTION

Figure 1:
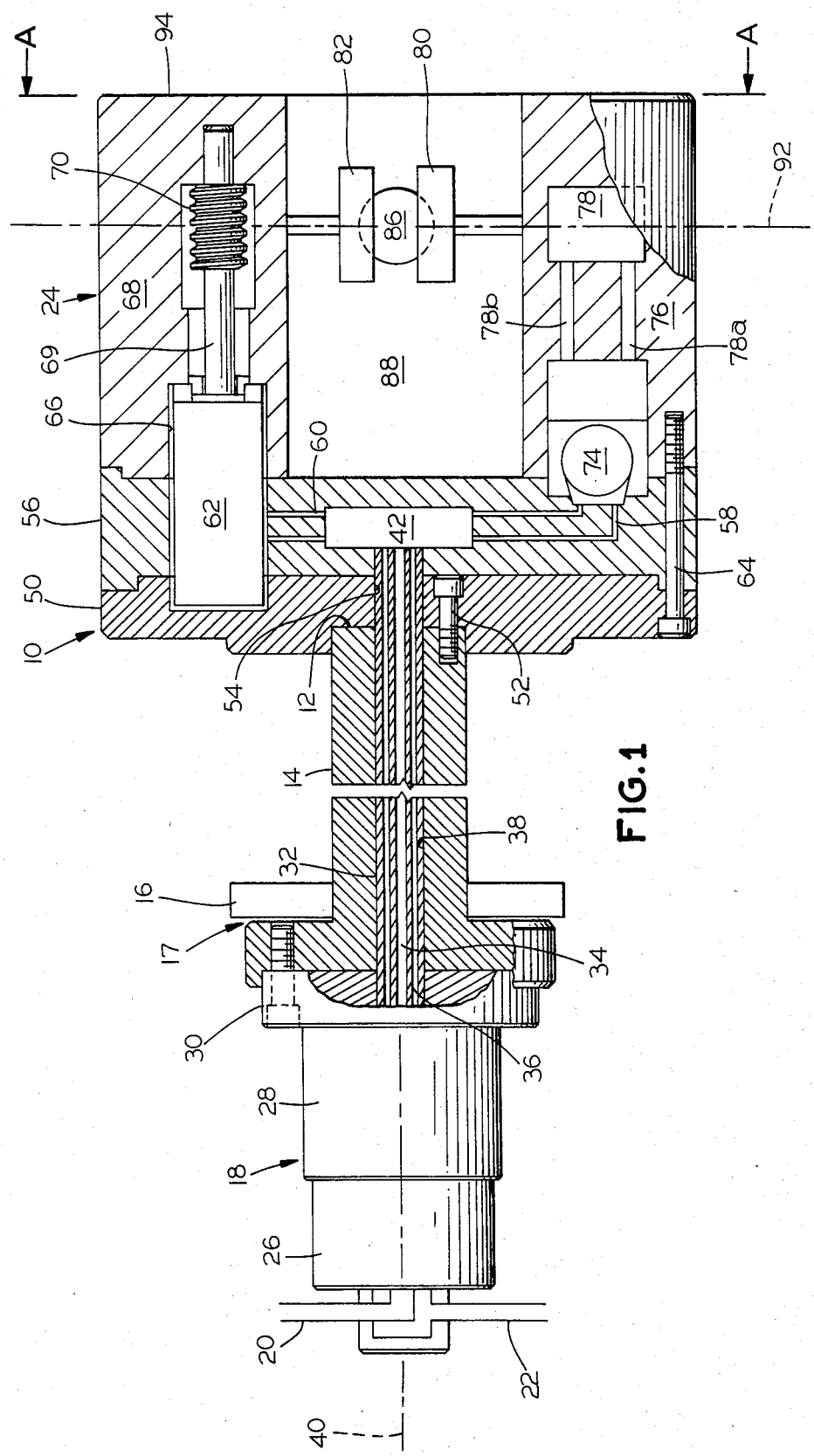
FIG. 1 shows a cross-sectional side view of an automatic indexing chuck incorporating the features of the present invention.

Referring now to FIG. 1 which shows a sectional view of an automatic indexing chuck assembly 10 mounted to a front end 12 of a lathe spindle 14 of a machine (not shown). The chuck assembly 10 includes a slip ring assembly 16 positioned about a rear end 17 of the lathe spindle 14, a hydraulic swivel connector 18 adapted for connection at one end to stationary inlet and return hydraulic lines 20, 22, respectively, and rotatably connected at the other end to the rotary driven lathe spindle 14 by means well known in the art. The slip ring assembly 16 is adapted for conducting electrical signals by means well known in the art to indexing and clamping means, as described hereinafter, within an indexing chuck 24. The hydraulic swivel connector 18 includes a stationary part 26 attached to the inlet and return hydraulic lines 20, 22 by means well known in the art and a rotational part 28 attached to an adapter assembly 30 connected to the lathe spindle assembly and adapted for rotation therewith. The slip ring assembly and the hydraulic swivel connector are attached to the lathe spindle and adapter assembly 30 by means well known in the art. The adapter assembly has holes (not shown) drilled therein for passing hydraulic fluid from the hydraulic swivel connector to a double wall tube 32 having an interior passage 34 for passing inlet hydraulic fluid therethrough and an exterior passage 36 concentrically disposed about the interior passage for passing return hydraulic fluid therethrough. The double wall tube 32 has one end disposed within the adapter assembly with the interior and exterior passages in fluid communication with the holes therein by means well known in the art and passes through a center bore 38 symmetrically about a centerline axis 40 passing through the lathe spindle, said double wall tube extends through the lathe spindle 14 and is attached at the other end to a hydraulic distributor 42 disposed within the indexing chuck 24.

The indexing chuck 24 includes a chuck adapter plate 50, fixedly attached by bolts 52 or the like to the front end 12 of the lathe spindle 14, having an inlet aperture 54 centrally disposed therein and adapted for accommodating the double wall tube 32 passing therethrough and is fixedly attached to the hydraulic fluid distributor 42 for passing hydraulic fluid to and from the indexing chuck 24. A back plate 56 of the indexing chuck attached to the adapter plate 50 is adapted for accommodating the distributor 42, pressure and return lines 58, 60, respectively, and a hydraulic motor 62. A hydraulic pressure distribution system is described hereinafter in reference to FIG. 6. The adapter plate 50 and the back plate 56 are fixedly attached to the indexing chuck 24 by bolts 64 symmetrically disposed about the circumference of the adapter plate.

Figure 2:
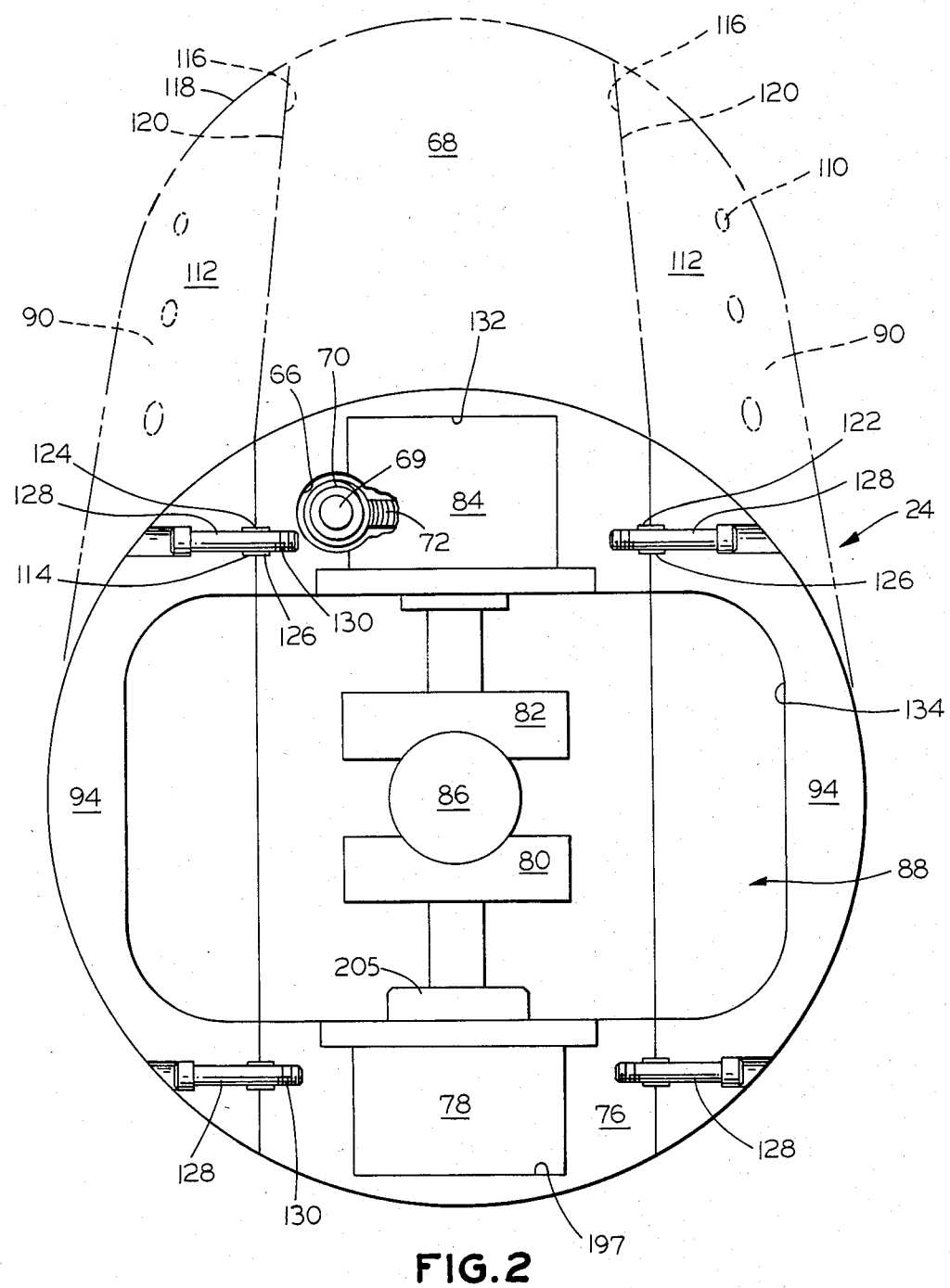
FIG. 2 shows a perspective view of a chuck housing in the AA direction of FIG. 1.
Figure 3:
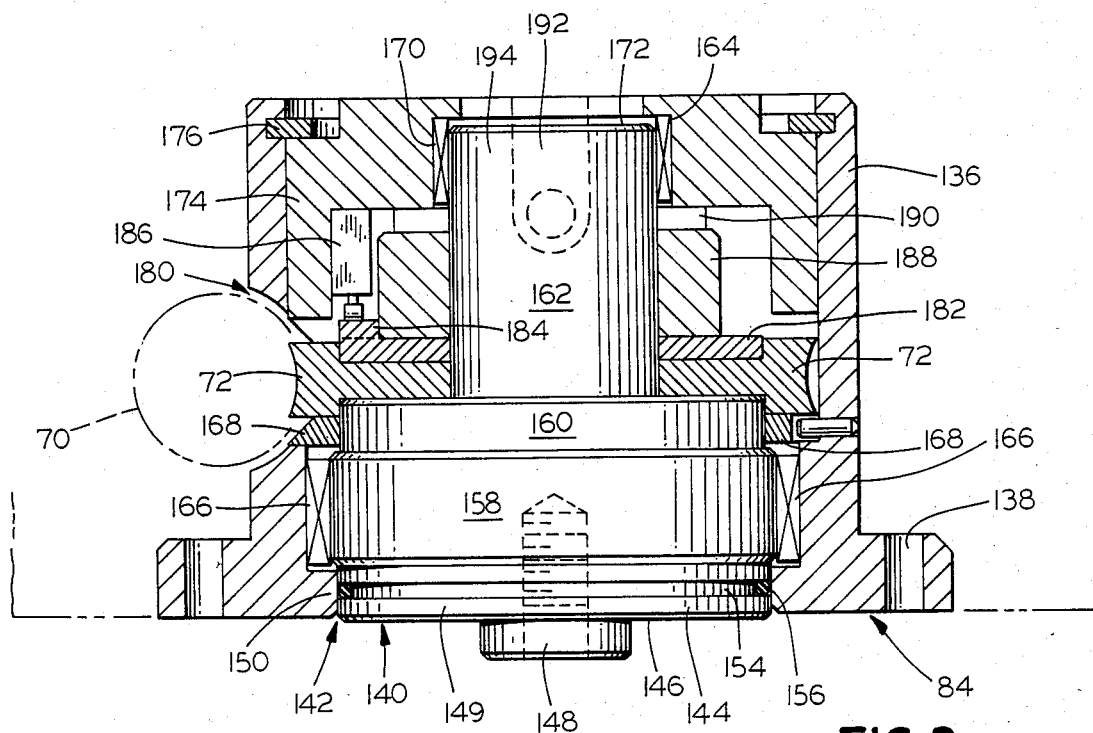
FIG. 3 shows a simplified cross-sectional view of the indexing jaw assembly.

The hydraulic motor 62, securely disposed within an elongated motor cavity 66 extending from the adapter plate through the back plate into a top plate 68 has a shaft 69 with a worm gear 70 attached thereto for engagement with a wheel gear 72 as more fully shown in FIG. 3. A first solenoid valve 74 disposed within a bottom plate 76 of the indexing chuck is hydraulically connected to a clamping jaw assembly 78, as more fully shown in FIGS. 2 and 4, by clamping hydraulic inlet and return tubes 78a and 78b, respectively. A clamping jaw 80 is fixedly attached to the clamping jaw assembly 78 and an indexing jaw 82 is fixedly attached at an indexing assembly 84 as more fully shown in FIGS. 2 and 3. A workpiece 86 is shown disposed between the indexing jaw and the clamping jaw. It is to be recognized that the surface configurations of the indexing and clamping jaws must be adapted to accommodate the shape of a workpiece. The clamping jaw, the indexing jaw and the workpiece are all disposed within an enlarged aperture 88, defined by the top plate 68, the bottom plate 76, side plates 90 as shown in FIG. 2 and the back plate 56. The enlarged aperture has dimensions sufficient to accommodate the workpiece and to allow the workpiece to be rotated about a rotation axis 92 passing through the top and bottom plates in an orthogonal relationship to the centerline axis 40.

As shown in FIGS. 1 and 2, the elongated motor cavity 66 disposed within the housing extends from within the adapter plate 50 through the back plate 56 and into the top plate 68 toward a front surface 94 of the indexing chuck. The hydraulic motor 62, the shaft 69, and the worm gear 70 are all fixedly secured within the elongated motor cavity by means well known in the art.

Referring now to FIG. 2 which shows a partial cutaway perspective front view of the automatic indexing chuck assembly 10. The indexing chuck assembly includes the indexing chuck 24 having a substantially cylindrical configuration with the enlarged aperture 88 centrally disposed therein and extending from the front surface 94 through the housing to the back plate 56. The chuck is fabricated by bolting together the top plate 68, in a spaced-apart opposed relationship with the bottom plate 76 utilizing the pair of oppositely disposed side plates 90. The side plates each have a row of counter bored bolt holes 110 extending from the exterior surface 112 of the housing through the side plate 90 to a side plate key groove 114 disposed along a first mating surface 116 of the side plate in a substantially parallel relationship with the first row of bolt holes 110 and extending from the front surface 94 to a rear surface 118 of the housing. The top plate 68 has oppositely disposed side surfaces 120 in a substantially parallel relationship to one another, each with a key groove 122 disposed therein wherein the key groove 122 cooperates with the side plate key groove 114 to form a key channel 124 therebetween. Disposed within the key channel 124 is a key 126 which extends substantially from the front surface 94 to the rear surface 118. The key includes a plurality of bolt holes (not shown) to allow bolts 128 to be inserted into each of the counter bored bolt holes 110, through the bolt holes in the keys into threaded anchor holes 130 disposed in the top plate 68 in alignment with the counter bored bolt holes 110 thereby securely connecting the side plates to the top plate. In a similar manner the side plates are connected to the bottom plate 76 thereby forming the rigid indexing chuck 24. Disposed within the top plate 68 is the indexing assembly 84, as more fully shown in FIG. 3, adapted for attachment to the indexing jaw 82.

Figure 9:
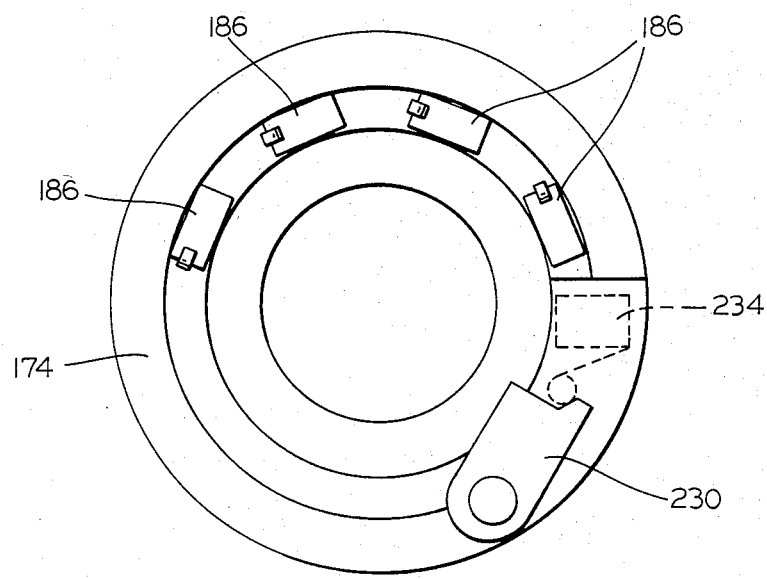
FIG. 9 shows a simplified bottom view of the switch and pawl housing with switches attached thereto.
Figure 10:
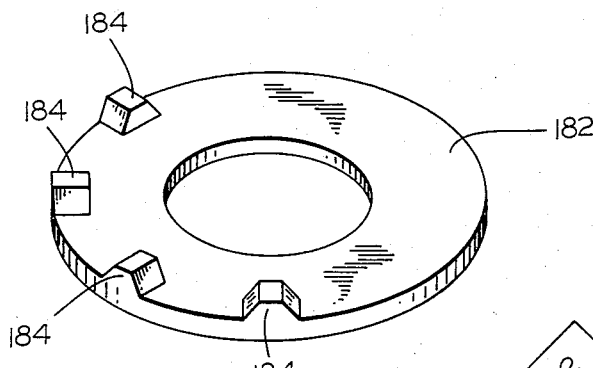
FIG. 10 shows a perspective view of the cam plate.

Referring to FIGS. 2 and 3 the indexing assembly 84 rotatably disposed within a recess 132 extending from an interior surface 134 of the centrally disposed enlarged aperture 88 in the chuck housing and interconnecting with the elongated motor cavity 66, as shown in FIG. 1 includes an index assembly housing 136 having bolt holes 138 for accommodating bolts (not shown) or the like for fixedly attaching the index assembly housing within the top plate 68 and having a substantially cylindrical configuration, an indexing shaft 140 disposed within a center cavity 142 of the index assembly housing said indexing shaft having a base 144 with a bottom surface 146 adapted for accommodating an integral key 148 for attaching and locating the indexing shaft to the indexing jaw 82 and having a bottom section 149 with a first diameter sufficient to provide a snug fit with retention lips 150 extending into the center cavity proximate the interior surface 134 of the centrally disposed enlarged aperture 88, with an O-ring groove 154 circumferentially disposed thereon for accommodating an O-ring 156 to provide a tight fit with the lips 150 to exclude contaminants, a middle section 158 having a diameter slightly larger than the diameter of the bottom section 149 whereby the retention lips 150 inhibit the middle section from passing between said retention lips, and a top section 160 having a diameter smaller than the diameter of the middle section. The indexing shaft 140 has a cylindrical surface 162 at the top and extends to approximately the top 164 of the index assembly housing. A first antifriction bearing 166 symmetrically disposed around the circumference of the middle section positions the base within the center cavity 142 of the index assembly housing while spacer 168 position the top section 160 within the index assembly housing and a second antifriction bearing 170 symmetrically disposed around the indexing shaft 140 proximate the top surface 172 thereof positions the indexing shaft within a switch and pawl housing 174 disposed within the center cavity 142 proximate the top of the index assembly housing and extending into the center bore. The switch and pawl housing is restrained within the index assembly housing 136 by a snap ring 176. The wheel gear 72 symmetrically disposed about and fixedly attached to the indexing shaft 140 is adapted for engagement with the worm gear 70 through an aperture 180 within the vertical side of the assembly housing. A cam plate 182 as more fully shown in FIG. 10 is disposed symmetrically about the indexing shaft 140 and is fixedly attached to the wheel gear such that as the wheel gear turns the cam plate turns. The cam plate has disposed thereon cam lobes 184. The cam lobes are adapted for engagement with switches 186 fixedly attached to the switch and pawl housing as more fully shown in FIGS. 9 and 11. The switches and the cam lobes cooperate to open and close electrical circuits for providing electrical signals to the solenoids as more fully shown in FIG. 6 for controlling the flow of hydraulic fluid for activating the motor 62.

Figure 7:
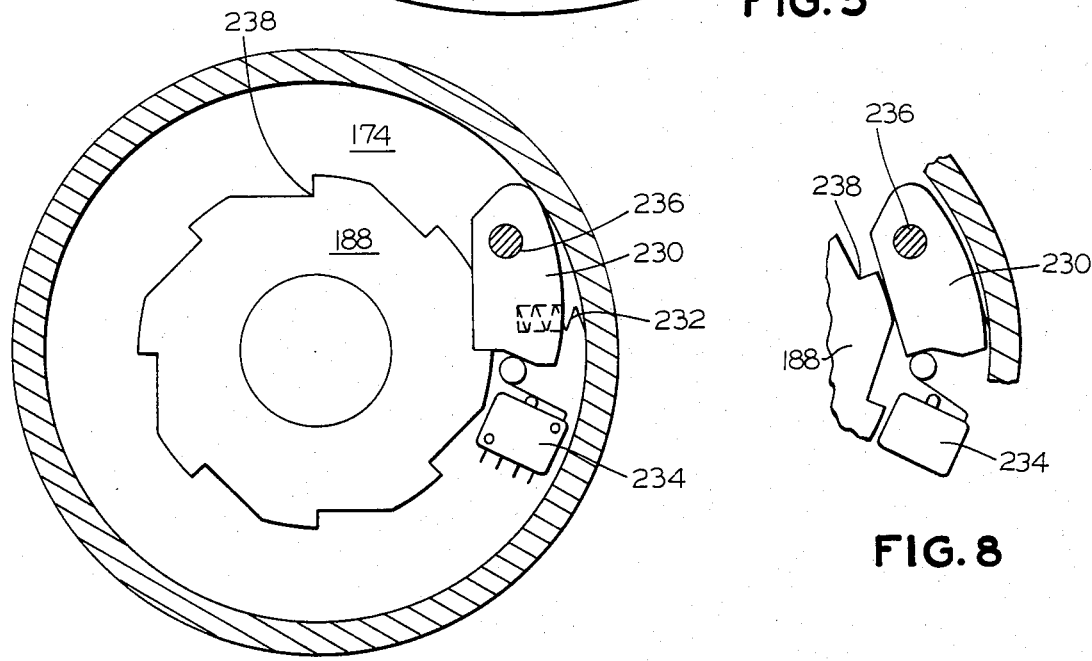
FIG. 7 shows a simplified cross-sectional top view of the indexing jaw assembly as shown in FIG. 3.

An indexing notch wheel 188 as more fully shown in FIG. 7 is positioned symmetrically about the indexing shaft 140 and is disposed on the top surface of the cam plate 182, third antifriction thrust bearings 190 are positioned symmetrically about the indexing shaft and separate the switch and pawl housing from the indexing notch wheel. A key 192 is disposed between the switch and pawl housing 174 and the index assembly housing 136 to prevent relative motion therebetween. The index assembly 84 is adapted for being readily inserted and removed from the indexing housing without dismantling the chuck from the lathe spindle to enable the replacement of the indexing assembly and for replacement of the cam plate and switch arrangement for changing the degree of rotation of the part to be machined for various machining operation and/or repeat machining of various parts or for a quick change of the entire index assembly.

Figure 4:
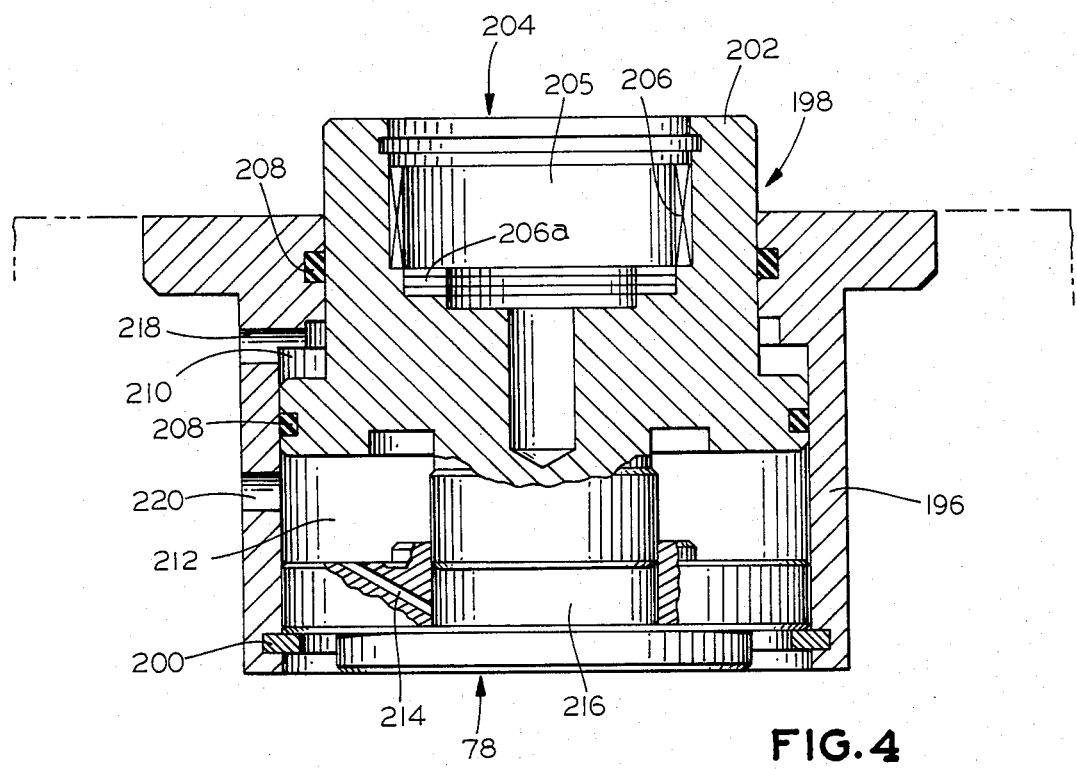
FIG. 4 shows a simplified cross-sectional view of the clamping jaw assembly.

Referring now to FIG. 4 which shows a simplified cross-sectional view of the clamping jaw assembly 78. The clamping jaw assembly includes an outer housing 196 adapted for insertion into a clamping jaw cavity 197 disposed within the bottom plate as shown in FIG. 2. A clamping jaw piston 198 is slidably disposed within the outer housing and contained therein with snap ring 200. The clamping jaw assembly includes shaft 202 adapted for vertical movement within the outer housing, a cavity 204 adapted for accommodating the centering false jaw 205 as shown in FIG. 2 rotatably disposed therein proximate the top of the clamping jaw piston, said centering false jaw is supported therein by fourth and fifth antifriction bearings 206, 206a, respectively to allow the false jaw to rotate while pressure is exerted on a workpiece as described hereinafter and the index jaw is rotated to rotate the workpiece. O-rings 208 disposed about the exterior surface of the clamping piston provide liquid tight seals between the unchucked pressure cavity 210, the first chucking pressure cavity 212 and the exterior of the outer housing. A hydraulic oil escape hole 214 connects the first chucking cavity with a second chucking cavity 216, a first passage 218 provides means for passing hydraulic fluid into the unchucked cavity for forcing the clamping piston to move from a chucked position to an unchucked position. A second passage 220 is adapted for passing hydraulic fluid into the chucking cavities for moving the clamping piston into the chucked position. The escape passage 214 provides a means for passing hydraulic fluid into and out of the second chucking cavity 216.

Figure 5:
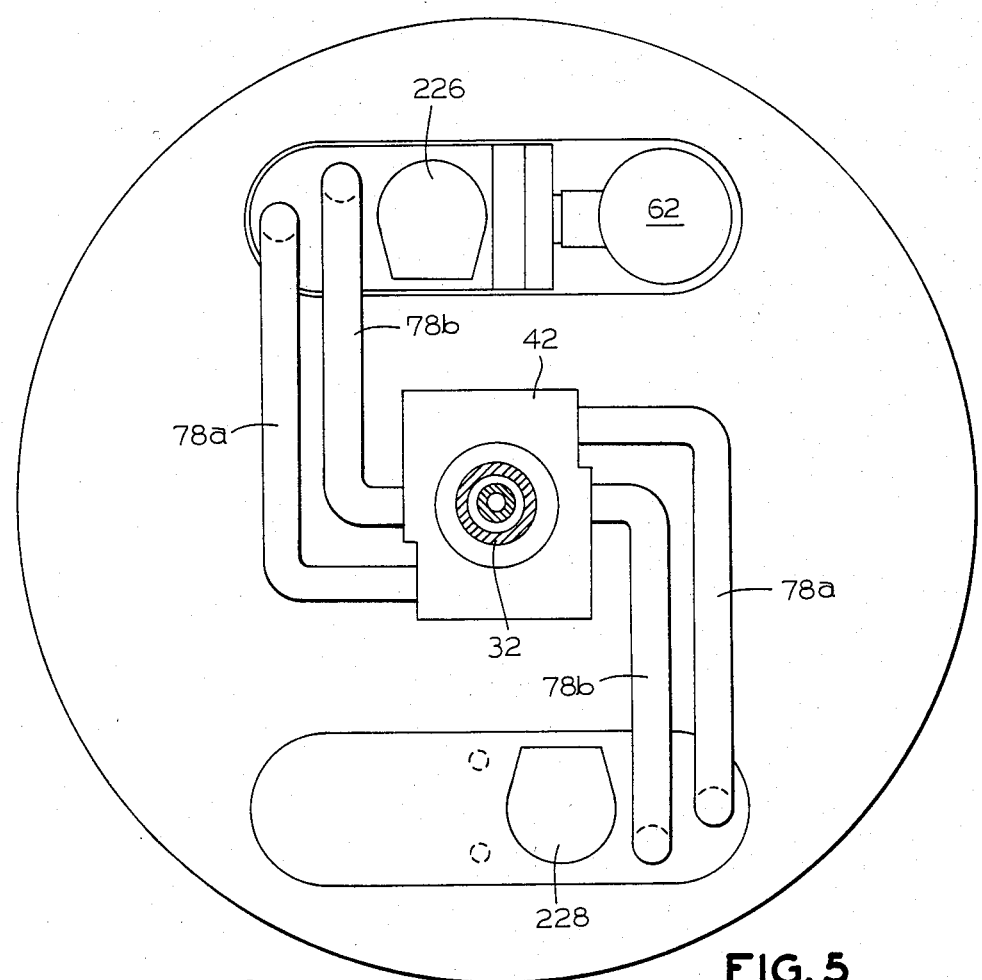
FIG. 5 shows a simplified cross-sectional view of the pressure manifold and solenoid valves.

Referring now to FIG. 5 which shows a simplified cross-sectional view of the pressure manifold and solenoid valves. The hydraulic distributor 42 attached to one end of the double wall tube 32 has hydraulic inlet passage tubes 78a and hydraulic return tubes 78b passing from the distributor 42 to the motor solenoid valve 226 which connects to the hydraulic motor 62 disposed within the top plate and to the clamping solenoid valve 228 connected to the clamping jaw assembly 78 as more fully shown in FIG. 6 which shows a schematic diagram of the hydraulic pressure system of the present invention as described in more detail hereinafter.

Figure 8:
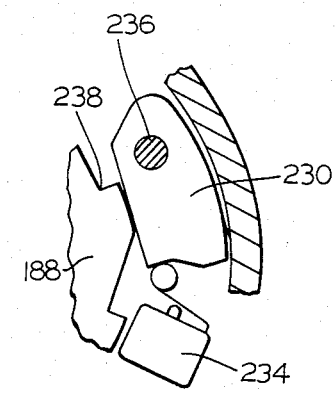
FIG. 8 shows a simplified view of the pawl in an unlocked position.
Figure 11:
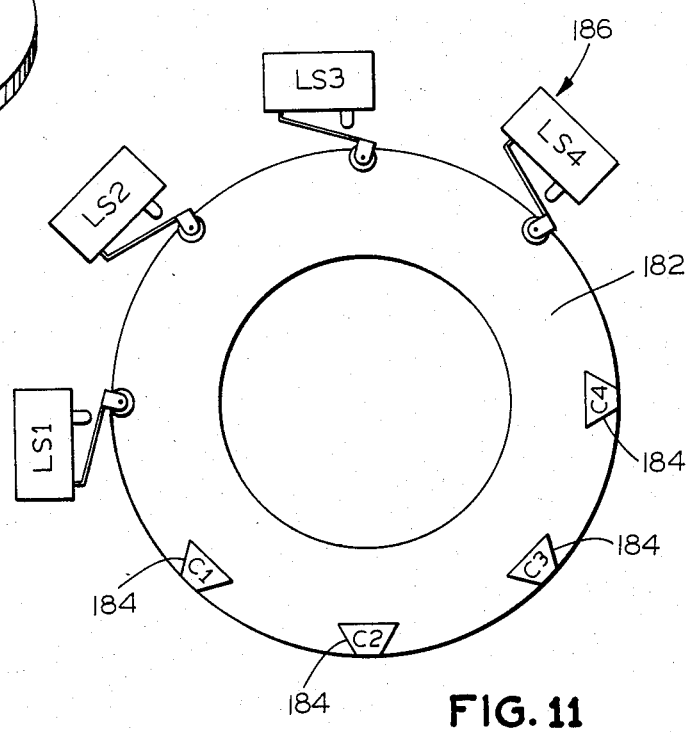
FIG. 11 shows a simplified schematic view of the positional location of the switches and cam lobes on the cam plate for an eight position machining operation.

Referring now to FIG. 7 which shows a simplified cross-sectional top view of the indexing jaw assembly as shown in FIG. 3 which shows a pawl 230 spring loaded by a spring 232 which forces the pawl into the locked position on the index notch wheel 188 and a pawl lock switch 234. The pawl is rotatably attached to the switch and pawl housing 174 as shown in FIG. 3 by a pivot pin 236, the pawl lock switch is positioned in electrical series with the cam switches 186 as shown in FIGS. 3, 9 and 11 to provide a locked electrical signal at all indices. It is to be recognized that the number of notches 238 in the index notch wheel will be a function of the number of angular positions of which the part is to be machined and may be readily changed for different applications by removing the index assembly 84 as shown in FIG. 3 and replacing it with another index assembly having an appropriate number of notches. FIG. 8 shows a simplified view of the pawl switch notch configuration in the unlocked position as compared to the locked position as shown in FIG. 7. FIG. 9 shows a bottom view of the switch and pawl housing 174 showing switches 186 attached thereto together with the pawl 230 also attached to the switch and pawl housing.

Referring now to FIG. 10 which shows a simplified perspective view of the cam plate 182 and the lobes 184 disposed thereon. The switches 186 are positioned about the interior of the switch and pawl housing in a spaced-apart position with respect to the cam lobes 184 such that as the various switches make contact with the cam lobes, electrical signals are transmitted to a signal processor by means well known in the art to activate and deactivate solenoid valve 226 as shown in FIG. 5 for positioning the workpiece with the indexing jaw 82 as shown in FIG. 1.

Referring now to FIG. 11 which shows a schematic representation of the position of switches LS 1, LS 2, LS 3 and LS 4 with respect to the cam lobes C1, C2, C3 and C4 positioned on the cam plate 182. It is to be recognized that the relative positions as shown in FIG. 11 provide electrical signals for each of eight rotational positions, i.e., every 45°. It is to be recognized that this system could also be programmed either manually or electrically for machining any one or a combination of the various positions as shown in Table 1.

TABLE 1

| Index Position | 0° 360° | 45° | 90° | 135° | 180° | 225° | 270° | 315° |
|---|---|---|---|---|---|---|---|---|
| LS 1 | 0 | C | C | C | C | 0 | 0 | 0 |
| LS 2 | 0 | 0 | C | C | C | C | 0 | 0 |
| LS 3 | 0 | 0 | 0 | C | C | C | C | 0 |
| LS 4 | 0 | 0 | 0 | 0 | C | C | C | C |

C = Limit Switch Closed

Additionally it is to be recognized that other position combinations could be used, for example, a six position combination could be utilized for machining operations every 60°. It is further to be recognized that the indexing notch wheel 188 as shown in FIG. 7 would have the number of notches 238 along the circumference of the indexing notch wheel equal to the number of positions as shown in Table 1, that is for an eight position machining operation the indexing notch wheel would contain eight notches, correspondingly, for a six position, that is every 60°, the indexing notch wheel would contain six notches. It is also to be noted that the switch 234 is activated and deactivated by the pawl 230 being engaged within the notch as shown in FIG. 7 and FIG. 8. Switch 234 is in electrical series with switches LS 1, LS 2, LS 3, and LS 4 as shown in FIG. 11. As the cam plate 182 rotates the first switch LS 1 contacts the first cam C1 and an electrical signal is generated to indicate that the indexing notch wheel, which also rotates with the cam plate, has rotated to the 45° position. As the indexing notch wheel 188 rotates from a first position to a second position the pawl 230 activates and deactivates switch 234. When the indexing notch wheel rotates sufficiently, pawl 230 drops and engages the notch 238 in the notch plate 188, switch 234 deenergizes solenoid valve 226 reversing the direction of rotation of the hydraulic motor 62. Additionally thereby reversing the rotation of the worm gear and the direction of rotation of the notch plate. The reversal of the direction of rotation forces the notch 238 against the pawl and holds it there with a force equal to the torque of the motor multiplied by the gear ratio. This force insures that the angular position of the workpiece does not change during the machining operation.

As can be seen from FIG. 11 as the cam plate is rotated through 360° eight various combinations of limit switch and cam contact can be obtained for each of the 45° rotation between zero and 360°. These various switch-cam contacts produce electrical signals which can be transmitted from the chuck housing to a control panel which may contain either manual selection switches or can be controlled by a computer assisted process. The electrical signals move from the chuck housing to the selection panel through the slip ring 16.

In operation the limit switch and pawl housing 174, the indexing notch wheel 188, the switches 186 and the cam plate 182 all as shown in FIG. 3 are preselected to conform to the number of angular operations and the angular rotation required for the machine process on a particular part. After these parts have been preselected the index assembly is fabricated and inserted into the recess 132 as shown in FIG. 2 within the top plate. The indexing jaw 82 as shown in FIG. 1 configured to a shape compatible with the shape of the part 86 which is to be machined, is then attached to the indexing jaw assembly and the part to be machined is disposed between the indexing jaw 82 and the clamping jaw 80 as shown in FIG. 1.

Figure 6:
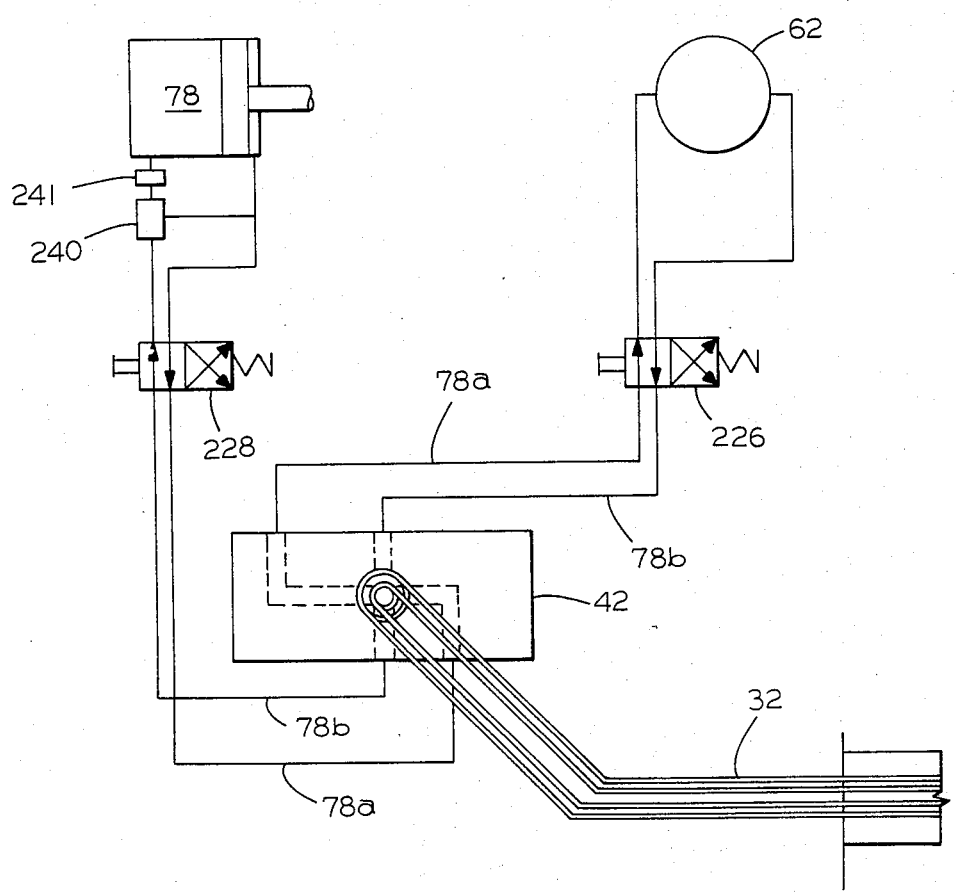
FIG. 6 shows a schematic diagram of the hydraulic pressure system of the present invention.

As a safety consideration the system is designed as described in more detail hereinafter such that when the power to the solenoid valve is off, the system is in a chuck and locked mode. This ensures that if the electrical power is lost during operation the jaws 82, 80 will continue to securely hold the part therebetween and the part will be held in the indexed and locked position. Once the indexing assembly has been structured to rotate a workpiece in predetermined angles as noted hereinbefore, the operation of the present invention is as follows. The workpiece 86 is inserted between the indexing and clamping jaws 82, 80, respectively and the preselector is set to 0° or the home position. The centerline axis 40 is also the centerline axis of the indexing chuck. The centerline of the part to be machined must be superimposed on the centerline axis. The application of hydraulic and machining forces should not destroy this relationship. Hydraulic fluid is passed through the inlet hydraulic line 20 and the system is pressurized. Since the preselector switch is in the home position, the clamping solenoid valve 228 is in an open position thereby maintaining the clamping jaw actuator in a chucked mode of operation. A check valve 240 as shown in FIG. 6 maintains the clamping jaw assembly in the check position while the clamping solenoid 228 remains in the open position. If the hydraulic pressure to the indexing chuck should fail, this chuck valve will maintain the chucking pressure. With the workpiece at the zero or home position the first machining operation is performed on the workpiece 86. Upon completion of the first operation the preselector assembly is either manually or computer assisted moved to its second position thereby causing electrical signals to the motor solenoid 226 placing it in the index position which activates the bidirectional hydraulic motor 62 which causes the worm gear 70 to rotate thereby producing rotation of the indexing jaw assembly to the next position. When the pawl 230 as shown in FIG. 7 moves from the first position within the first notch 238, switch 234 opens thereby activating switches LS 1, LS 2, LS 3 and LS 4 as shown in FIGS. 11 and 9. As the ratchet rotates, the cam plate 182 also rotates until the first cam lobe C1 is in contact with the first switch LS 1 at which point the pawl 230 falls from a first position to a second position within the notch 238 and the limit switch 234 closes deactivating the motor solenoid 226 thereby reversing the hydraulic fluid to the solenoid motor causing said motor to reverse its direction causing said ratchet wheel to reverse its rotation direction to be forced against the pawl 230. This ensures that the backlash within the motor assembly is eliminated since the ratchet is always rotating in the same direction for operation on the workpiece. The reversal of the indexing motor also ensures that the workpiece will not move during operation and that the angular positioning of the workpiece is accomplished with a high degree of accuracy. During the rotation of the workpiece the clamping jaw remains in the chuck position and rotates with the workpiece within the bottom plate 76 of the housing. With the workpiece in a second angular position the second machining operation is commenced. Upon completion of the second machining operation the above-referenced procedure is repeated with the workpiece being rotated to the third angular position. The machining operation is again accomplished and the workpiece is again rotated until said workpiece is rotated and machined through all of the preselected angular rotations.

As shown in FIG. 6 after the workpiece has been completely machined, an electrical signal from the processer stops the lathe spindle. The operator activates the unchuck switch which energizes solenoid valve 228 thereby applying hydraulic fluid through the first passage in the chucking jaw assembly 218 into the unchucked cavity 210 causing the clamping piston 202 as shown in FIG. 4 to move to the unchucked position. As the clamping piston 202 moves to the unchucked position the hydraulic fluid within the chucking cavities 212 and 216 passes through the second passage 220 as shown in FIG. 4 thereby allowing the piston to move into these cavities. It is to be recognized that in the chucking mode hydraulic fluid is passed through the second passage 220 into the chucking cavities 212 and 216 causing the chucking piston 202 to move toward the indexing jaw. Hydraulic fluid within the unchucked cavity 218 passes through the first passage 210 and out of the system. The pressurization and depressurization of the chucking and unchucking cavities is accomplished by the chucking solenoid valve 228 moving from a chuck position to an unchuck position thereby interchanging the pressurization of the hydraulic fluids going from the solenoid valve to the clamping jaw assembly 78.

During the chucking and unchucking operation the indexing jaw assembly remains stationary while the clamping jaw assembly moves toward or away from the indexing jaw assembly. The electrical signals to activate the clamping jaw solenoids 228 and the indexing jaw solenoid valve 226 as well as switches LS 1, LS 2, LS 3, LS 4 and switch 234 pass from the index chuck assembly 10 to the preselector through the slip ring assembly 16 by means well known in the art. It is to be recognized that the present invention has two failsafe systems. The first failsafe system is in the indexing jaw assembly whereby deactivation of the indexing solenoid valve causes the indexing motor to rotate in or remain in its locked position such that the ratchet notch 238 is forced against the pawl 230. The second is that the clamping jaw solenoid, when deenergized, drives the clamping jaw fixture into the chuck position.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A chuck of the indexing type comprising a chuck housing having a top plate adapted for accommodating indexing means for rotating a workpiece within the chuck housing;

an index assembly housing disposed within the top plate for rotating the workpiece and adapted for removable insertion within the top plate, an indexing shaft adapted for rotation within the index assembly housing, a wheel gear fixedly attached to the indexing shaft and adapted for engagement with means for rotating an indexing jaw;

means for locking the indexing shaft at each rotational position;

a cam plate fixedly attached to the indexing shaft and adapted for rotation therewith;

a plurality of cam lobes disposed about the outer diameter of the cam plate in an angular spaced-apart relationship from one another;

a plurality of switches disposed in a spaced-apart vertical relationship to the cam lobes and adapted for synchronous engagement therewith as the cam lobes rotate with the indexing shaft;

means for transmitting electrical signals from the switches to means for controlling the angular rotation of the indexing shaft;

a bottom plate disposed in a spaced-apart parallel relationship to the top plate and adapted for accommodating clamping means for rigidly holding a workpiece within the chuck housing;

clamping means disposed within the bottom plate said clamping means adapted for cooperating with the indexing means for rigidly securing a workpiece therebetween within the chuck housing while allowing the workpiece to rotate about a rotation axis passing through the clamping means and the indexing means;

a pair of side plates disposed in a spaced-apart relationship to one another adapted for rigidly securing the top and bottom plates in a spaced-apart relationship to one another;

means for rigidly securing the side plates and the top and bottom plates to form the chuck housing having the enlarged aperture therein extending from a front surface of the chuck housing to a back surface thereof and symmetrically disposed about a centerline axis passing axially through the chuck housing, said aperture having dimensions sufficient to accommodate a workpiece therein;

a back plate fixedly attached to a back surface of the chuck housing adapted for attachment to means for rotating the chuck housing about the centerline axis;

an indexing jaw disposed within the enlarged aperture proximate the front surface of the chuck housing removably attached to the indexing means for rotating the indexing jaw about an axis orthogonal to the centerline axis and passing through the top and bottom plates;

a clamping jaw disposed within the enlarged aperture diametrically opposed the indexing jaw and removably attached to the clamping means when the indexing and clamping jaws are adapted for rigidly holding a workpiece therebetween;

means for activating the indexing means;

means for activating the clamping means; and means for controlling the rotation of the indexing jaw.

2. The invention in accordance with claim 1 wherein the means for rigidly connecting the side plates to the top and bottom plates are key grooves within both sides of the top plate, the bottom plate, and each of the side plates wherein the key grooves in the side plates cooperate with the key grooves within the top plate and the bottom plate to form key channels extending from the front surface of the chuck housing to the back surface of the chuck housing at each interface of the side plate with the top plate and with the bottom plate;

a key disposed within the key channels and extending from the front surface to the back surface of the chuck housing; and means passing through the keys for attaching the side plates to the top plate and the bottom plate.

3. The invention in accordance with claim 2 wherein the means passing through the keys for attaching the side plates to the top plate and the bottom plate is a plurality of bolts disposed within bolt holes passing through the side plates, the keys and into the top plate and the bottom plate.

4. The invention in accordance with claim 1 wherein the means for locking the indexing shaft at each rotational position includes an indexing notch wheel fixedly attached to the indexing shaft for rotation therewith;

a movable pawl reciprocably movable toward and away from the indexing notch wheel and adapted for engagement with notches on such indexing notch wheel; and an index lock switch, said lock switch being in an electrical series with the plurality of limit switches for detecting rotational position.

5. The invention in accordance with claim 1 wherein the means for rotating an indexing jaw includes a worm gear engageable with the wheel gear;

a bidirectional hydraulic motor engageable with the worm gear;

means for providing hydraulic fluid for activating the hydraulic motor; and solenoid valve means for changing the direction of rotation of the bidirectional hydraulic motor.

6. The invention in accordance with claim 5 wherein the solenoid valve is electrically connected to the index lock switch such that when the pawl becomes engaged within the notches of the indexing notch wheel, the solenoid is deactivated thereby reversing the direction of the hydraulic motor and providing a positive lock on the angular position of the indexing shaft.

7. The invention in accordance with claim 1 wherein the clamping means includes a clamping jaw assembly having an outer housing adapted for insertion within the bottom plate of the chuck housing;

a clamping piston disposed within the outer housing said clamping piston adapted for reciprocal motion within the outer housing toward and away from the indexing means within the top plate;

hydraulic means for pushing the clamping piston away from the indexing means to an unchucked position;

chucking hydraulic means for moving the clamping piston toward the indexing means for chucking a workpiece;

hydraulic means for providing hydraulic pressure to the clamping piston; and means for directing the hydraulic fluid for moving the clamping piston to the chucked or unchucked position.

8. The invention in accordance with claim 7 wherein the means for directing the hydraulic fluid is a clamping solenoid valve responsive to electrical signals for moving said solenoid valve from a first position adapted for providing hydraulic pressure to move the clamping piston to a chucked position and for motion to a second position for providing hydraulic fluid for moving the clamping piston to the unchucked position.

9. The invention in accordance with claim 8 further including means for passing electrical signals from the chuck housing to a preselector panel for controlling the angular rotation of the indexing shaft.

10. In a chuck of the indexing type having a housing adapted for accommodating a workpiece therein, with means for clamping and rotating the workpiece within the housing, the improvement comprising:

an index assembly housing adapted for removable insertion within the housing for rotating the workpiece, an indexing shaft adapted for rotation within the index assembly housing, a wheel gear fixedly attached to the indexing shaft and adapted for engagement with means for rotating the means for clamping the workpiece;

means for locking the indexing shaft at each rotational position;

a cam plate fixedly attached to the indexing shaft and adapted for rotation therewith;

a plurality of cam lobes disposed about the outer diameter of the cam plate in an angular spaced-apart relationship from one another;

a plurality of switches disposed in a spaced-apart vertical relationship to the cam lobes and adapted for synchronous engagement therewith as the cam lobes rotate with the indexing shaft; and means for transmitting electrical signals from the switches to means for controlling the angular rotation of the indexing shaft.

11. The invention in accordance with claim 10 wherein the means for locking the indexing shaft at each rotational position includes an indexing notch wheel fixedly attached to the indexing shaft for rotation therewith;

a movable pawl reciprocably movable toward and away from the indexing notch wheel and adapted for engagement with notches on such indexing notch wheel; and an index lock switch, said lock switch being in electrical series with the plurality of switches for detecting rotational position.

12. The invention in accordance with claim 10 wherein the means for clamping and rotating the workpiece includes a worm gear engageable with the wheel gear;

a bidirectional hydraulic motor engageable with the worm gear;

means for providing hydraulic fluid for activiting the hydraulic motor; and solenoid valve means for changing the direction of rotation of the bidirectional hydraulic motor.

13. The invention in accordance with claim 12 wherein the solenoid valve is electrically connected to the index lock switch such that when the pawl becomes engaged within the notches of the indexing notch wheel, the solenoid is deactivated thereby reversing the direction of the hydraulic motor and providing a positive lock on the angular position of the indexing shaft.

* * * * *